United States Patent [19]

Betts

[11] Patent Number: 4,630,286
[45] Date of Patent: Dec. 16, 1986

[54] DEVICE FOR SYNCHRONIZATION OF MULTIPLE TELEPHONE CIRCUITS

[75] Inventor: William L. Betts, St. Petersburg, Fla.

[73] Assignee: Paradyne Corporation, Largo, Fla.

[21] Appl. No.: 659,289

[22] Filed: Oct. 10, 1984

[51] Int. Cl.$^4$ .................. H04L 27/02; H04L 7/02
[52] U.S. Cl. .................................. 375/39; 375/118
[58] Field of Search .............. 375/118, 38, 39, 12, 375/58; 455/59, 60, 8, 139

[56] References Cited

U.S. PATENT DOCUMENTS

| | | | |
|---|---|---|---|
| 3,304,500 | 2/1967 | Likel | 375/38 |
| 3,311,442 | 3/1967 | Jager et al. | 455/59 |
| 3,343,093 | 9/1967 | Gerwen | 375/38 |
| 3,588,702 | 6/1971 | Tisi | 375/39 |
| 3,701,852 | 10/1972 | Sluijter et al. | 375/38 |
| 3,955,141 | 5/1976 | Lyon et al. | 375/39 |
| 4,355,397 | 10/1982 | Stuart | 375/39 |
| 4,520,483 | 5/1985 | Arita et al. | 375/118 |

Primary Examiner—Marc E. Bookbinder
Assistant Examiner—Andrew J. Telesz, Jr.
Attorney, Agent, or Firm—Kane, Dalsimer, Kane, Sullivan & Kurucz

[57] ABSTRACT

This invention pertains to a method and system for transmitting high speed data from a transmitter to a receiver over several low speed data channels. At the receiver end the differences in the transmission times between data channels are detected and the signals from the faster data channels are delayed to insure that the output high speed data stream is correctly assembled. The differences in the transmission times are monitored during data transmission and if a change is detected the transmission is interrupted and retraining is requested.

11 Claims, 5 Drawing Figures

DEVICE FOR SYNCHRONIZATION OF MULTIPLE TELEPHONE CIRCUITS

RELATED DISCLOSURES

The present disclosure is related to my co-pending applications entitled "Digital Modem For Multiple Telephone Circuits", Ser. No. 580,672, filed Feb. 16, 1984 and "High Speed Modem for Multiple Communication Circuits", Ser. No. 659,287, filed on even date herewith and incorporated herein by reference.

1. Field of Invention

This invention pertains to a method and device of transmitting digital information at a high data rate over several relatively low data rate communication channels.

2. Description of the Prior Art

It is known that the rate of data communication over leased data channels is limited by the maximum speed of said channels and the modems used to interface with the channels. In order to overcome this barrier an LSD (Line Sharing Device) has been used. This device, also known as an N-plexer, receives data bits at a high rate from a DTE and distributes these data bits to several modems which operate at a lower bit rate than the bit rate of the DTE. Each modem encodes its share of the bits into corresponding analog signals, which then are transmitted over leased data channels. At the receiving end several modems, one per channel, are used to demodulate the signals and a second LSD is used to reassemble the low speed demodulated signals into a single high speed bit stream.

However this scheme requires the use of several complete modems in addition to the LSD. Furthermore complications arise if several different types of data channels are used simultaneously because they could introduce delays in the system.

OBJECTIVES AND SUMMARY OF THE INVENTION

In view of the disadvantages outlined above, it is an objective of the present invention to provide a single modem which could be used to transmit a single high rate bit stream over several low rate data channels.

A further objective is to provide a system adapted to handle several types of communication channels by automatically adjusting to their different time delays.

Another objective is to provide a system with a single modem at each end to provide cost, space, and energy savings.

A further objective is to provide a communication system which automatically adjusts to channel switching during data transmission.

Other advantages and objectives shall become apparent in the following description of the invention.

According to this invention, the data bits received over several different channels are sent to a single modem which is adapted to determine the differential delay, if any, between the different channels and to adjust the corresponding decoded data streams accordingly so that they can be recombined properly in a single high speed bit stream. Means are provided for monitoring the received data to detect when one or more channels have been switched by third parties thereby changing said differential delay. The receiving modem then interrupts the data transmission and requests a retraining sequence during which the differential delay is recalculated.

DESCRIPTION OF THE PREFERRED EMBODIMENT

Figure 1:
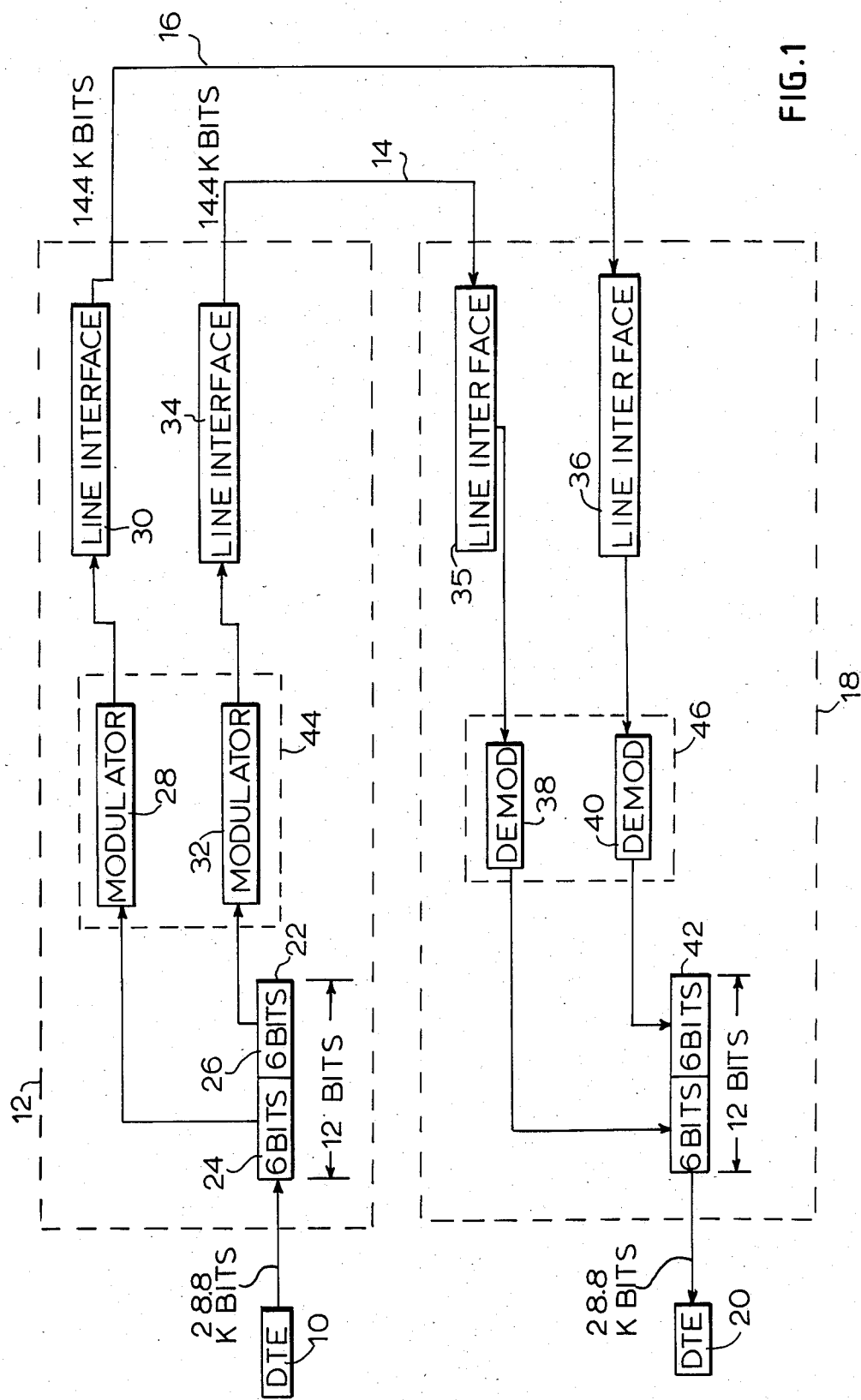
FIG. 1 shows two modems interconnected by two data channels in accordance with the present invention.

The present invention is best explained in conjunction with FIG. 1. In this Figure DTE 10 sends data to a modem 12 at a high rate such as 28.8 kilobit/sec. The modem 12 is connected to two 14.4 kbit/sec. voice bandwidth data channels 14 and 16 for transmitting data signals to a second modem 18. This second modem demodulates the data from the two channels and recombines it into a single 28.8 kbit/sec. stream which is sent to a second DTE 20.

Within modem 12, the data received from DTE 10 is fed serially into a 12 bit register 22 with parallel-output capability. The contents of the left half 24 of the register 22 are fed into a first modulator 28 which modulates each 6 bits into corresponding 14.4 k bit/sec., 2.4 k baud signals. These signals are transferred to data channel 16 by line interface circuit 30. Similar to the circuit described in an article entitled "A Single-chip High-Speed CMOS Analog Modem Front-End" by Bahram Fotouki and Roubik Gregorian and available from the IEEE under Order No. CHI859-8/83/0000-0084. Similarly the contents of the right half 26 of register 22 are processed by modulator 32 and transferred to channel 14 by line interface circuit 34.

At the receiving modem 18 analog signals from channels 14 and 16 are transferred by line interface circuits 35 and 36 to two demodulators 38 and 40 respectively which process said data. The resulting binary data is fed from demodulators 38 and 40 to the left and right halves, respectively, of a twelve bit register 42. From register 42 the bits are serially sent to DTE 20 at 28.8 kbit/sec.

In the above-mentioned and commonly assigned co-pending application Ser. No. 580,672 filed on Feb. 16, 1984, I have disclosed a modem for exchanging data between several DTE's and several communication channels. Briefly the invention therein takes advantage of a microprocessor's ability to handle the data between the several DTE's and the corresponding data channels within a single duty cycle, whereby each DTE and data channel pair is serviced sequentially within said cycle. The same concept is utilized in this invention. Thus, while two separate modulators 28, and 32 and demodulators 38 and 40 are shown in FIG. 1, it should be understood that a single microprocessor (indicated by numerals 44 in modem 12, and 46 in modem 18) is used to perform the functions of these elements.

The two channels 14, 16 are shown as paralleling each other so that theoretically the data transmission along these channels occurs simultaneously and, thus, for example, a symbol A and a symbol B representing 12 bits of data received from DTE 10, which is sent simultaneously from modem 12 over channels 14 and 16 respectively, should arrive at modem 18 at exactly the same time so that the corresponding demodulated bits are assembled correctly by register 42. However in actuality the channels are not under the control of the user but are leased from telephone companies which normally do not guarantee that the transmission over any two channels will be identical. Typically a leased data channel may comprise telephone lines connecting the customer to the local telephone company center. Signals between telephone centers may be exchanged in any number of ways ranging from overhead wires to wireless radio communications through ground-based relaying stations or satellites. Therefore the time necessary for data signals to go from one data terminal location to another is a function of the actual routing taken by the signals. As mentioned before, the two channels leased at any given time may not follow the same route and therefore the transit time on the two channels may differ. However it is enough if one of the channels lags behind the other by only one baud to render the output to the receiving DTE meaningless. Therefore means are provided for detecting the difference in transit times and for delaying the bauds from the faster channel until they coincide with the bauds from the slower channels.

In the above-mentioned application entitled "High Speed Modem for Multiple Communication Circuits" the differential delay is determined when the training signals on the different channels are received. Once data transmission is begun, it is assumed that the differential delay stays constant for the remainder of the transmission. Since each new data transmission is preceded by a training sequence, the above mentioned assumption is valid for systems in which the duration of data transmissions is relatively short. However in certain situations once a channel is established it remains active (i.e., data is exchanged) for relatively long time periods of several weeks or even several months. It is quite possible that during this time one or more of the channels are switched from one path to another by the third parties. This switching may be due to mechanical failures, electronic interference or malfunction, excessive data traffic between two intermediate points, etc. Of course any such switching changes the differential delay and any subsequent data received after switching is garbled.

Therefore means are provided in the present invention to detect changes in the delay of a channel. Once such a change is detected the receiving modem terminates the demodulation of the data signals and requests a retraining sequence from the transmitting modem.

Figure 2:
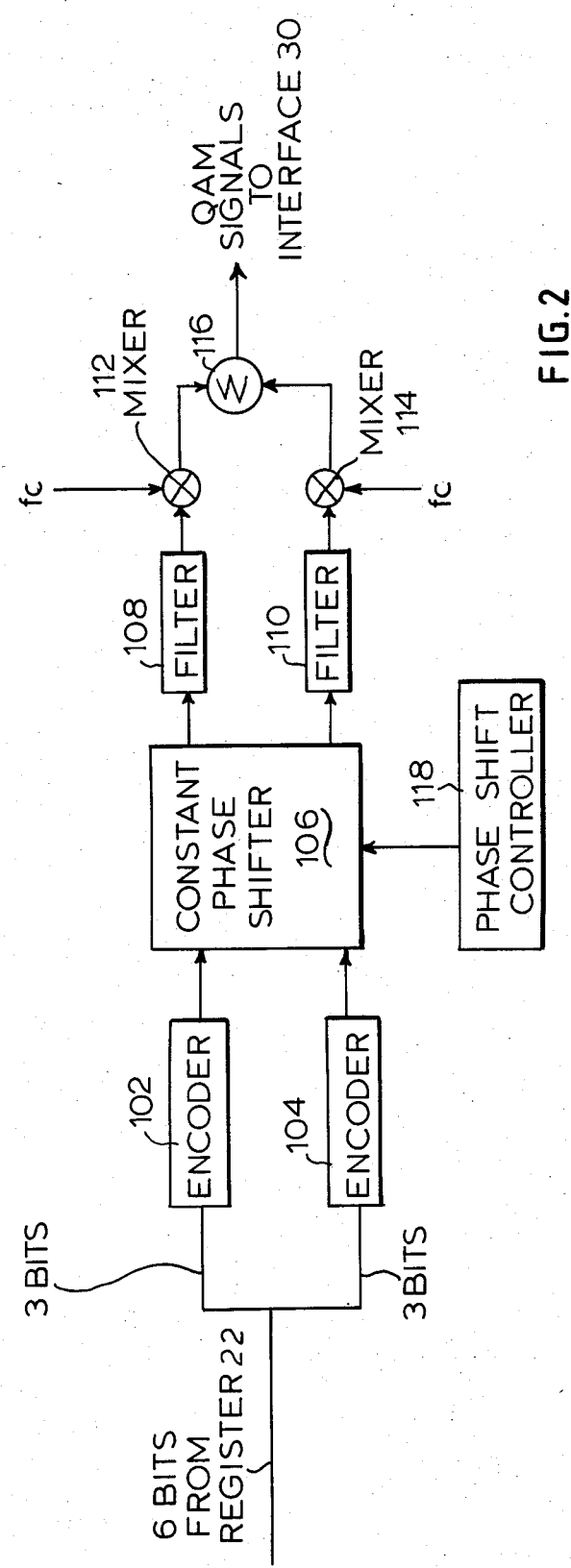
FIG. 2 shows details of the modulator incorporating phase switching means.
Figure 4:
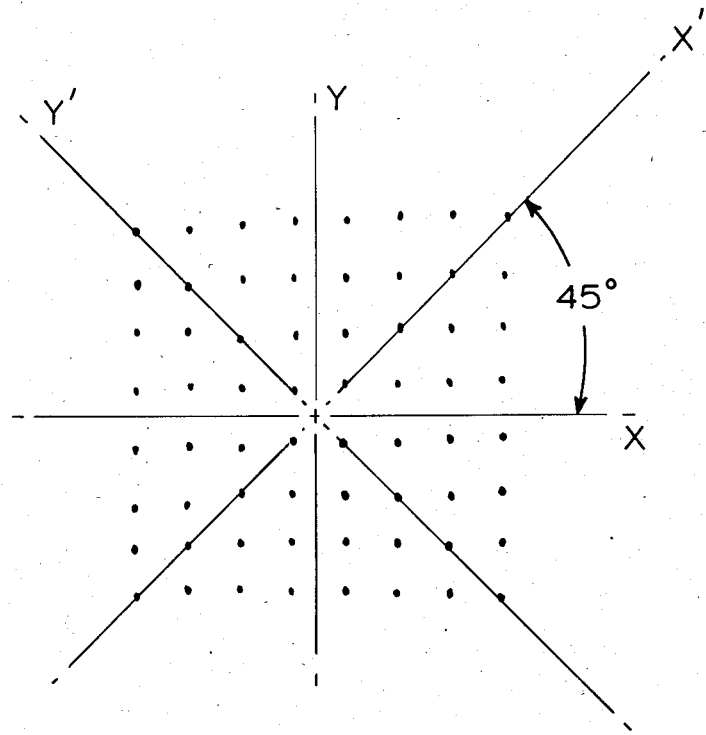
FIG. 4 shows the effects of phase switching on the signal constellation.

In order to provide a means of detecting channel switching, the data is modulated at the transmission modem as follows. It is contemplated that the subject data communication system uses a QAM-type modulation scheme. As shown in FIG. 2, in such a scheme, the six bits from register 22 of FIG. 1 are partitioned into two groups of 3 bits and fed into two encoders 102, 104. These encoders generate the in-phase and quadrature components of the QAM signals corresponding to the six input binary bits. These components are fed into a constant phase shifter 106 which phase shifts the points of the QAM signal constellation by a pre-selected angle. For example if a 64-point square constellation is used the phase shifter 106 rotates all the points by +45°. The effects of this rotation is shown in FIG. 4, with X and Y indicating the coordinates of the constellation generated by decoders 102, 104 and X', Y' indicating the coordinates of the same constellation shifted by +45°.

The output of the phase shifter 106 is low-pass filtered by filters 108, 110, and modulated by mixers 112, 114 with the sine and cosine of fc (i.e. the carrier frequency) and then summed in adder 116 in the manner well-known in QAM-type modems. Importantly the phase shifter 106 is operated by phase-shift controller 118. The controller is adapted to request a shift in a preselected repetitive manner preferably dependent on time or the number of transmitted QAM signals. For example the controller could be set to be idle (i.e. the modem operates without a phase-shift) for the first m baud periods, shift phase by 45° for the next n period (with reference to the first m-bauds), and then switch back to the idle mode and so on. Preferably the ratio n/m should be fairly small (such as 1/100) to insure that the system is not unduly degraded.

From the modulators the signals are sent to line interface 30, 34 (FIG. 1) described in more detail in the aforementioned patent application Ser. No. 580,672. From the interfaces the signal are transmitted over channels 14, and 16, which as previously described can differ by their actual physical paths. At the receiving modem 18, the signals are received by line interface circuits 35, 36 respectively and then demodulated by demodulators 38, 40. The method of operation of demodulator 38 is described below in conjunction with FIG. 3, but it should be understood that demodulator 40 operates in an identical function. Furthermore, while for the sake of clarity, two separate demodulators 38, 40 are shown in FIG. 1, it must be emphasized that a single microprocessor is actually used to perform the functions of both units 38 and 40.

Referring back to FIG. 3, the signals from line interface 35 are multiplied by fc by mixer 56 and then filtered by low pass filter 60 to eliminate the higher harmonics and then equalized by equalizer 62. A phase shifter 120 is used to rotate back the received signal to eliminate the effects of constant phase shifter 106. The phase shifter 120 is controlled by phase controller 122. Phase controller 122 is adapted to function in a mode complementary to the mode of operation of controller 118 (FIG. 2) (i.e. for every +45° phase shift from controller 106, controller 122 requests a −45° shift) so that neglecting any errors due to noise, the output of phase shifter 120 is identical to the input of phase shifter 106.

The signals from phase shifter 120 are passed through a phase angle corrector 124. The main purpose of the phase angle corrector is to compensate for the relative small transmission errors due to various factors such as phase jitter. A more complete description of a typical phase angle corrector can be found in the commonly assigned U.S. Pat. No. 4,532,640 and entitled "Phase Tracking Loop for Digital Modem" and incorporated herein by reference. Typically the phase angle corrector determines the phase error of each incoming signal, and uses this calculated phase error to compensate for said phase angle error of the next signal. In this particular application, the phase angle corrector also compares the phase angle error to a threshold value.

The phase-angle corrected signals are decoded by decoder 64 which generates a data bit stream identical to the stream fed to modulator 28 of FIG. 1.

The signals from interface 35 are also fed to training signal detector 68 provided to detect a training sequence on channel 14. Initially as soon as the proper sequence is detected the detector 68 sends an appropriate signal to XOR gate 72 and to phase control 122 to initialize its phase to coincide with the remote transmit phase control 118. If this signal precedes the corresponding signal from channel 16, it is assumed that the signals from channel 14 arrive first and latch 76 is set. The signal from detector 68 also enables counter 74 to start counting baud periods in accordance with baud timing circuit 69 which provides timing for both demodulators 38 and 40. The counter is disabled by a signal received from the demodulator 40 indicating that the signals have arrived on the second channel 16. In other words counter 74 contains the differential delay in baud periods between channels 14 and 16. This differential delay period is sent to a variable delay circuit 80, through gate 77 (enabled by latch 76) which in response delays the data bits from decoder 64 by an appropriate time period so that the bits from demodulators 38 and 40 are fed simultaneously to register 42. When no signals are received from counter 74, delay circuit 80 passes the data bits from decoder 64 without any delay.

If the signals arrive on channel 16 first the corresponding data bits are delayed in the identical manner until the signals from channel 14 catch up.

As previously described the two phase shifters 106, 120 of the respective modulator and demodulator are adapted and synchronized so that the rotation induced by the first is eliminated by the second. However if the channel interconnecting the respective modems is switched to a different path having a different delay the synchronization between the phase shifters is immediately lost. As a result a large phase angle error is detected by phase error corrector 124 which is larger than said threshold.

In response the phase error signal generates a retrain signal which is sent to the receiver modem controls (not shown) for halting the further demodulation of signals. An appropriate message is then sent to the sending modem requesting a new training sequence so that the appropriate differential delay can be accumulated by counter 74. This operation occurs if a large phase error is detected by either demodulation 38 or 40.

Figure 5:
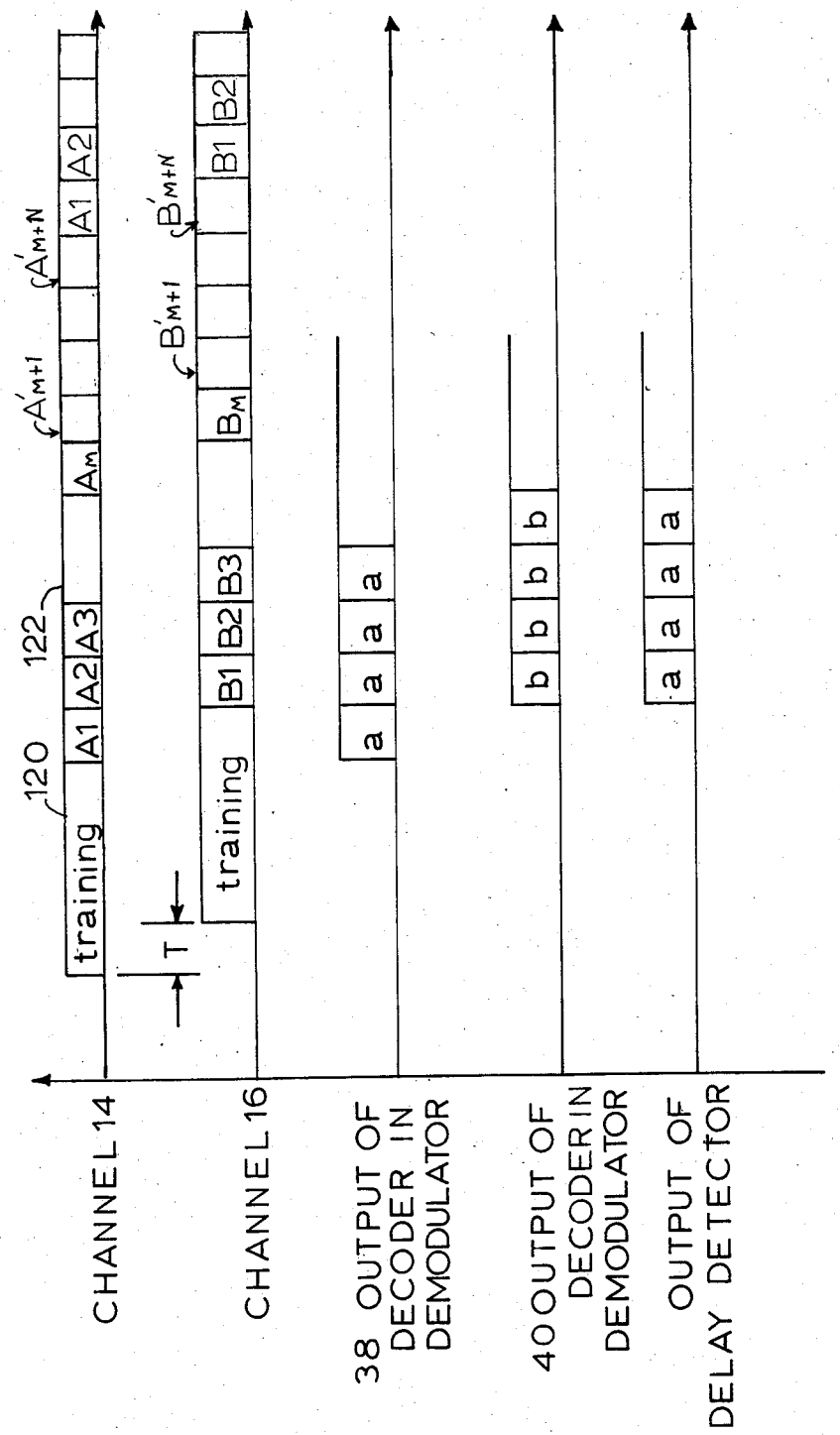
FIG. 5 shows a time chart of the different signals.

The operation of the system FIG. 1 is further illustrated in FIG. 5. Two messages are received by modem 18 on channels 14 and 16 respectively. The message on channel 14 arrives first, with a differential delay of T between the two channels as shown. The message on channel 14 consists of a training sequence 120, and a sequence of signals 122 $A_1$, $A_2$, $A_3$. All the signals up to and including signal $A_M$ are sent without any phase shift. The signal succeeding $A_M$ is phase shifted by 45° and is identified as $A'_{M+1}$. The demodulator 38 is preset to expect a phase shift M signals after it has detected the first data signal $A_1$. If the phase shift occurs either before or after $A_{M+1}$ a phase error is generated and a retrain request is sent to modem 12. After $A'_{M+N}$, signal $A_1$ is phase shifted by $-45°$.

Except for the differential delay T, the message on channel 16 is identical in format to the message on channel 14. In the demodulator 38 the A data signals are decoded into data bits a, and similarly the B data signals are decoded by demodulator 46 into data bits b. In order to synchronize them the data bits corresponding to the message which arrived first (in this case the a data bits) are delayed by T to allow bits corresponding to the later message to catch up. The two sets of data bits are then combined in register 42.

Figure 3:
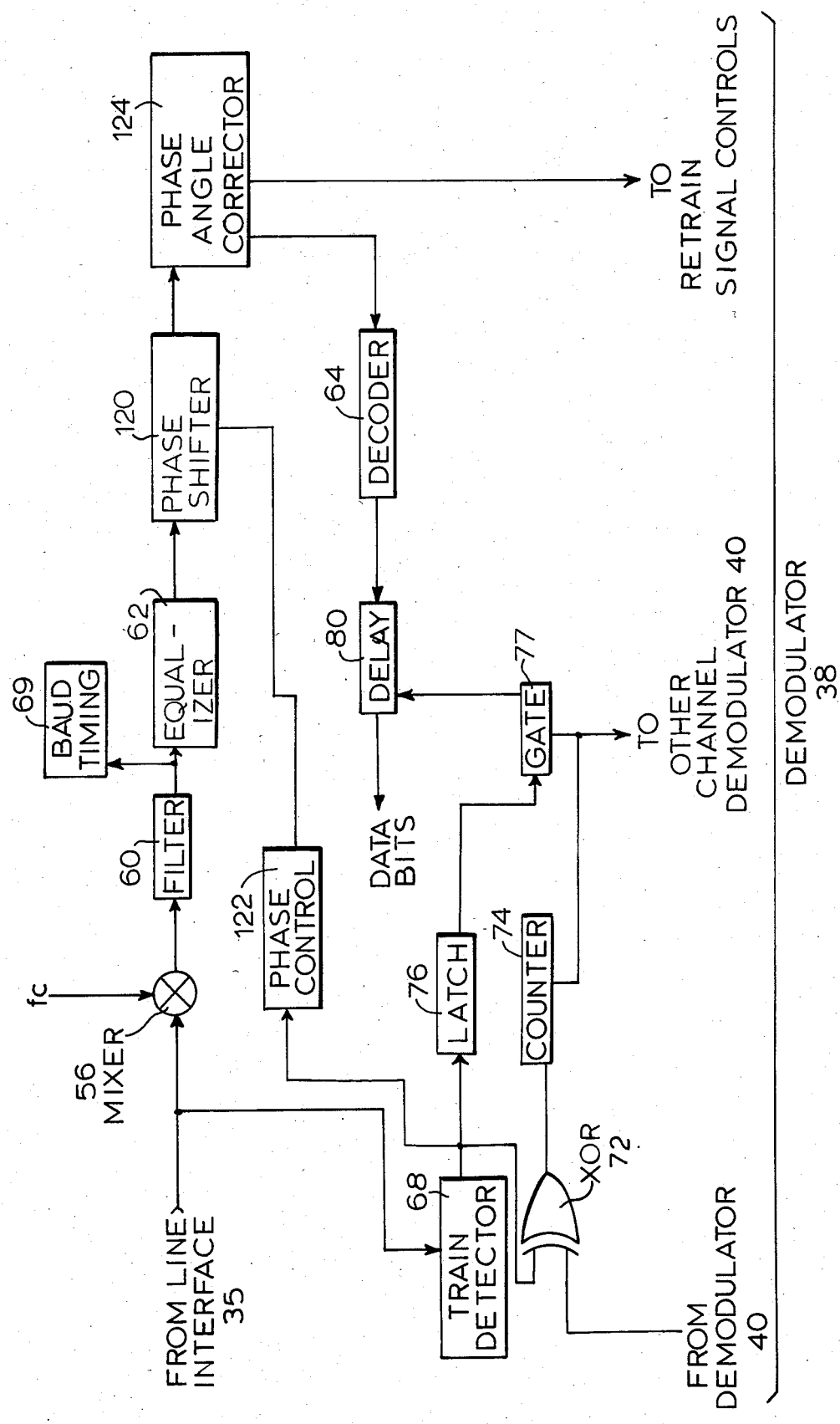
FIG. 3 shows details of the demodulator incorporating variable delay means and phase switching means.

In the embodiment of FIG. 3, delay 80 is shown at the output of decoder 64. This delay circuit may also be placed at the input of equalizer 62 so that the equalizers and decoders of both demodulators 38 and 40 operate simultaneously. However in this configuration the delay would have to be equipped to handle more bits per second.

I claim:

1. A system for exchanging high speed data signals over two low speed data channels comprising:
    a. transmitter means coupled to said data channels for receiving a high speed data stream from data transmission equipment and including:
        1. partitioning means for partitioning said high speed data stream into a first and a second low speed data stream;
        2. a first modulator section coupled to said partitioning means for generating a first stream of modulated signals each said modulated signals having angular components corresponding to said first low speed data stream for transmission over a first of said low speed data channels;
        3. a second modulator section coupled to said partitioning means for generating a second stream of modulated signals corresponding to said second low speed data stream, for transmission over a second of said low speed data channels; and
        4. transmitter phase shifting means for selectively shifting the phase of said first low speed data stream in a first predetermined pattern; and
    b. receiver means coupled to said data channels for receiving said first and second streams of modulated signals and including:
        1. a first demodulator for generating a first output data stream corresponding to said first stream of modulated signals;
        2. a second demodulator for generating a second output data stream corresponding to said second stream of modulated signals;
        3. delay detecting means for detecting a differential delay between said first and second streams of modulated signals,
        4. delay means for causing one of said first and second output data streams to be delayed in accordance with said differential delay; and
        5. receiver phase shifting means for selectively shifting the phase of said first output data stream in a second predetermined pattern complementary to said first predetermined pattern;
        6. phase monitoring means for monitoring the angular components of said first output data stream to generate a phase error signal when said angular components deviate from a preset criteria; and
        7. combining means for generating a combined output data stream from said first and second output data streams.

2. The system of claim 1 wherein said modulators generate quadrature amplitude modulated signals.

3. The system of claim 2 wherein said first and second stream of modulated signals are preceded by first and second training signals on the corresponding channels, and wherein said first demodulator further comprises a first training detector for detecting said first training signals; said second demodulator further comprises a second training detector for detecting said second training signals; and said delay detecting means is coupled to said first and second training detectors for detecting said differential delay.

4. The system of claim 3 wherein said delay detection means comprises a counter which is activated when training signals are detected by one of said training detectors, and is deactivated when training signals are detected by the other of said training detectors, said counter generating a count signal corresponding to said differential delay.

5. The system of claim 4 wherein said delay detector means comprises a first latch which is activated when said first training signals are detected first, and a second latch which is activated when said second training signals are detected first.

6. The system of claim 4 wherein said delay means comprises a first variable delay circuit for delaying said first output data stream in accordance with said count signal when said first latch is activated; and a second variable delay circuit for delaying said second output data stream in accordance with said count signal when said second latch is activated.

7. The system of claim 3 wherein, in response to said error signal the receiver requests new training signals from said transmitter to determine a new differential delay.

8. The system of claim 3 wherein said transmitter and receiver phase shifters generate a zero phase shift for every m bands followed by a phase shift of +45° and −45° respectively for the next n bands.

9. The system of claim 8 wherein the ratio of n/m is much less than 1.

10. The system of claim 1 wherein said partitioning means comprises a serial-in/parallel-out shift register having a first register half coupled to said first modulator and a second register half coupled to said second modulator.

11. The system of claim 1 wherein said combining means comprises a parallel-input/serial output shaft register with a first half coupled to said first demodulator and a second half coupled to said second demodulator.

* * * * *